Figure 1:
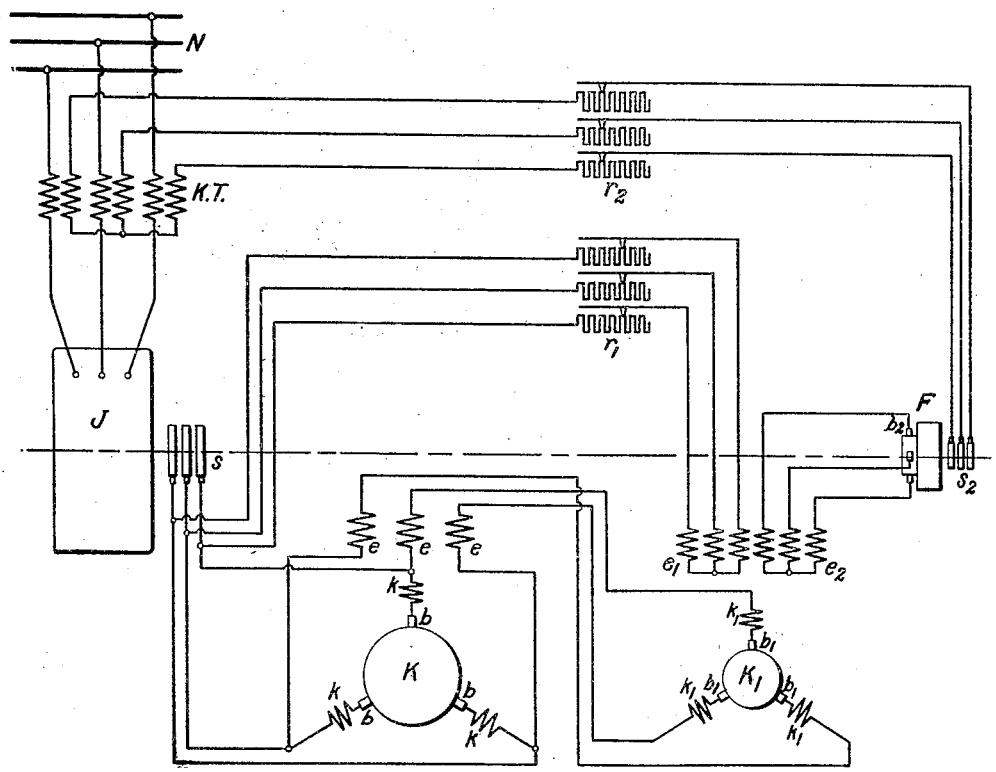

Jan. 5, 1926.

W. SEIZ 1,568,695

CASCADE INDUCTION MOTOR REGULATION

Filed August 21, 1922    2 Sheets-Sheet 1

Inventor:
Walter Seiz:
by Albert G. Davis
His Attorney.

Jan. 5, 1926.                                                      1,568,695
                              W. SEIZ
                  CASCADE INDUCTION MOTOR REGULATION
                  Filed August 21, 1922    2 Sheets-Sheet 2

Inventor:
Walter Seiz,
by
His Attorney.

Patented Jan. 5, 1926.

1,568,695

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

CASCADE INDUCTION-MOTOR REGULATION.

Application filed August 21, 1922. Serial No. 583,112.

*To all whom it may concern:*

Be it known that I, WALTER SEIZ, a citizen of the German Realm, residing at Baden, Switzerland, have invented certain new and useful Improvements in Cascade Induction-Motor Regulation, of which the following is a specification.

My invention relates to cascade induction motor regulators and more particularly to an improved method and apparatus for compounding a cascade consisting of an induction motor and a commutator machine.

In order to give a cascade consisting of a wound rotor induction motor and a shunt commutator machine, a compound characteristic, that is to say, an additional drop in speed in proportion to the load, the field of the commutator machine must be altered in an amount proportional to the load. In order to supply the inducing voltage required at the terminals of the exciter winding of the commutator machine, there must be introduced into the exciting system a voltage which is proportional to the watt component of the rotor circuit of the cascade and also proportional to the slip. This voltage can be induced by way of a transformer having a high magnetic reluctance, the primary of which is traversed by the rotor current of the cascade. This known arrangement has however the disadvantage that the transformer operating with a small slip frequency must be made comparatively large. Also the voltage thus induced is proportional to the entire rotor current of the cascade and not to its watt component, and the voltage induced by the wattless current must again be compensated by special auxiliary means.

The primary object of my invention is to avoid the disadvantages incident to placing the series transformer in the secondary circuit of the motor. In carrying my invention into effect, I place the series transformer in the primary circuit of the motor and connect the secondary of this transformer through a frequency converter to the exciting system of the commutator machine. As the cascade is as a rule designed for a primary power factor of unity the voltage induced in the secondary winding of the series transformer when connected according to my invention is proportional to the watt current and thus to the torque of the motor, which is the condition desired. This secondary voltage of a transformer so connected, however, is independent of the slip, whereas to produce such speed regulation as I have described it should be proportional to the slip to which the motor adjusts itself for a given load. This voltage may be made proportional to the slip by means of an adjustable resistance connected in series with the secondary circuit of the transformer.

Figure 2:
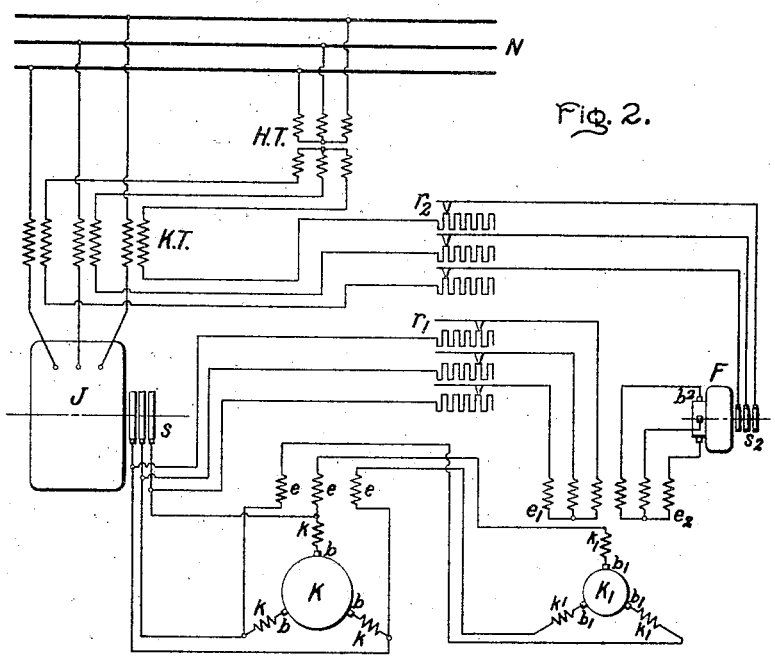
Figure 3:
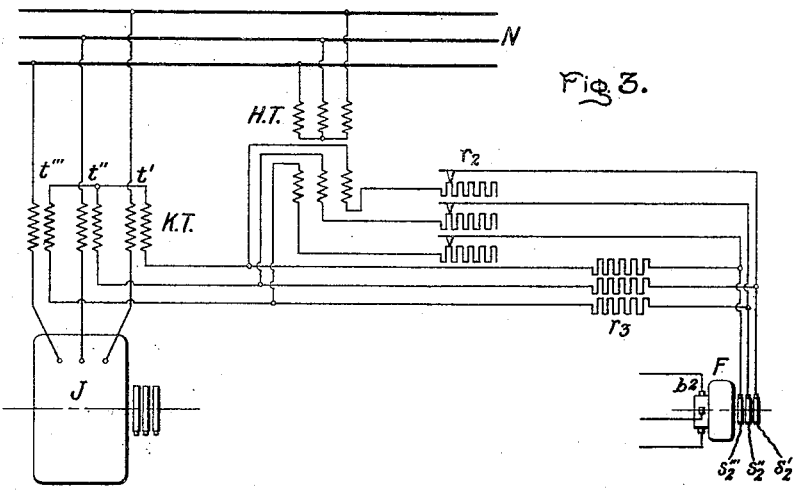

The features of my invention which I believe to be novel and patentable will be pointed out in the claims appended hereto. The method of operation and the preferred apparatus for carrying my invention into effect will now be explained in connection with the accompanying drawings; in which Fig. 1 shows the general scheme of connection for carrying my invention into effect; Fig. 2 shows a modification whereby the voltage required to cover the resistance drop of the exciting current of the commutator machine is supplied through the frequency converter from the primary supply system; and Fig. 3 is a simplified modification for accomplishing the same purpose as the apparatus shown in Fig. 2 under certain conditions.

Referring to Fig. 1, the excitation of the commutator machine K is fed by the slip rings $s$ of the induction motor and by an exciting machine $K_1$ in series. The exciters K and $K_1$ are driven at constant speed in any suitable manner. N is the supply system, J the induction motor; K the commutator machine having brushes $b$, compensating winding $k$ and exciting winding $e$. The exciting winding is connected between the slip rings $s$ of the induction motor and the exciting machine $K_1$ by way of compensating windings $k_1$ and brushes $b_1$ thereof. The exciting machine has two exciting windings, $e_1$ and $e_2$. The winding $e_1$ is fed by the slip rings $s$ of the induction motor through a regulating resistance $r_1$ and thus cause the excitation of machine $K_1$ to have a voltage component, adjustable as desired, which is proportional to the slip of the motor J. Winding $e_2$ is connected to the commutator brushes $b_2$ of a frequency converter F, which must run synchronously with the induction motor J and may therefore be mounted on the same shaft. The frequency converter F operates like an ordinary rotary converter, in that its commutator voltage at $b_2$ is proportional to its slip ring voltage at $s_2$. The slip rings $s_2$ of the frequency converter are fed through an adjustable resistance $r_2$ from the secondary winding of the series transformer KT, the primary winding of which is traversed by the primary current of the induction motor J. The adjustable resistance $r_2$ is set once for all for each desired no load speed and is not adjusted during load changes unless a different setting is desired. The value to be given to the resistance $r_2$ in any particular case is arrived at by the following considerations. The series transformer KT gives a secondary current proportional to the primary current of the motor J for any given value of the resistance $r_2$ and neglecting losses, this current may be assumed to be zero at no load without serious error. Now, suppose it is desired to have a no load slip corresponding to $s$ and a full load slip equal to $s+\Delta s$ corresponding to a primary load current A. If, now, for the no load slip $s$ the resistance $r_2$ is made to constitute the predominating factor of the impedance of its circuit and is adjusted to be equal to $\frac{a}{(s+\Delta s)}$ where $a$ is a constant depending upon the characteristics of the system, then at full load current A in the induction motor primary there is required a voltage on the coils $e_2$ of the exciter $K_1$ equal to $a_1 A(s+\Delta s)$, $a_1$ being another constant depending upon the characteristics of the frequency changer circuit. The slip ring voltage at the frequency converter being proportional to the commutator voltage, is equal to $a A(s+\Delta s)$. Therefore, by making $r_2 = \frac{a}{(s+\Delta s)}$ and by the proper choice of the constants, we can enforce a slip of $s+\Delta s$ at current A. In general, it is desirable to have the additional slip proportional to the load. For any other load current, say, $\frac{A}{2}$, we obtain a voltage on coils $e_2$ of $a_1 \frac{A}{2}(s+\Delta s)$. To be absolutely correct, if the slip is to be exactly proportional to the load at current $\frac{A}{2}$, the voltage impressed upon coils $e_2$ should be $a_1 \frac{A}{2} \frac{(s+\Delta s)}{2}$. The error thus introduced is small. The error will be small if $\Delta s$ is small and $s$ is large. Near synchronism, the error may be very large, but here the slip will be determined not by the inductive, but by the ohmic voltage of the exciting current, which must be taken care of in some other known manner.

The newly proposed connection is of special importance when the ohmic voltage drop of the exciting current of the commutator machine is likewise supplied through a frequency converter from the supply system. Because then, under certain circumstances, the voltage of the frequency converter can be combined with that required for the compounding. Fig. 2 shows this connection. N is the supply system, J the induction motor, K the commutator machine with the exciting winding $e$, K' the exciting machine with the exciting winding $e_1$ and $e_2$. Exciting winding $e_2$ is connected to the commutator brushes $b_2$ of the frequency converter F, the slip rings $s_2$ of which are fed through the regulating resistance $r_2$ from the secondary winding of the compound transformer KT, the primary winding of which is traversed by the primary current of the induction motor, the secondary winding of the transformer KT being in series with the secondary winding of the transformer HT, the primary of which is connected to the supply system N.

The transformer HT takes care of the ohmic drop in voltage of the exciting current in the exciting circuit of the commutator machine K. As this exciting current is about proportional to the slip, the ohmic drop is also at least approximately proportional to the slip with a constant resistance in this circuit. Since the secondary voltage of the transformer HT is constant, the resistance $r_2$ must have the value of $\frac{b}{s}$ where $b$ is a constant, said value corresponding to the no-load slip $s$. The compounding on the other hand requires the value $\frac{a}{s+\Delta s}$. By properly proportioning it is possible to make $\frac{b}{s'}$ equal to $\frac{a}{s''+\Delta s'}$, for any value of no load slip $s'$. Thus, for this slip, the same regulating resistance $r_2$ in the connection of Fig. 2 may be used for the regulation of the secondary voltages of the transformers KT and HT. If with other values of the no-load slip the same resistance is used for the regulation of both transformers, there will be a small error in the voltage used to take care of the ohmic drop of the exciting current or an error in the compounding voltage. In the first case the resulting exciting current changes its phase, in the second case the amount of the compounding varies. Within certain limits both errors are small.

The secondary voltage of the transformer HT and the voltages induced by the primary current of the induction motor in the secondary part of the transformer KT must be relatively displaced in phase by 90 degrees. The ratio of the resistance $r_2$ to the reactance of the circuit in which it is contained must always be great enough so that the current strength is controlled by the resistance.

If the influence of the transformer KT is temporarily disregarded, the phase of the slip ring voltage of the induction motor J and therewith the phase of the exciting field and the exciting current of the commutator machine will be displaced with respect to the commutator voltage of the frequency transformer by an angle which is approximately independent of the no-load speed and which is approximately proportional only to the load. This is due to the inductive voltage drop in the induction motor under load. The commutator voltage of the frequency converter should take care of the ohmic drop of the exciting current. This phase displacement is not therefore generally desirable. Since the angle of displacement is proportional to the load current only, it can be compensated for by the action of the transformer KT. If the transformer KT is so proportioned that its primary current induces a voltage in the secondary winding in addition to that required for the compounding, which voltage is displaced in phase by about 90 degrees relative to the voltage induced by the transformer HT, this voltage will affect the displacement of the slip ring voltage and therewith the commutator voltage of the frequency converter. As this additional voltage is proportional only to the primary current of the induction motor, the commutator voltage of the frequency transformer will, if the proper dimensions are maintained, shift at every load by the same angle by which the slip ring voltage of the induction motor shifts, and thereby compensates the relative displacement of both voltages. Even when no compounding is desired, a transformer KT in the connection of Fig. 2 can be used solely for the purpose of the compensation of the said displacement.

The arrangements of Figs. 1 and 2 may be operated through synchronism. However, it should be borne in mind that when changing from super-synchronism to sub-synchronism or vice versa, the phase rotation of the secondary of the induction machine reverses and consequently the phase rotation of the circuits associated with the secondary should be changed to correspond.

It is a known expedient to use a compound transformer, the primary side of which is traversed by the primary current of the induction motor and the secondary current of which is fed to the slip rings of the frequency converter through a constant resistance for the purpose of taking care of the ohmic drop of the additional exciting current required for compounding. This current must be displaced in phase by 90 degrees relative to the current generated by the secondary voltage of the transformer KT. Where the voltage desired for taking care of the ohmic drop of the additional exciting current is not in phase with the current but is displaced 30 degrees relative thereto, the simplified connection as shown in Fig. 3 may be used wherein only the circuit of the frequency converter is shown. In Fig. 3, the auxiliary transformer HT has its secondary built with an open neutral point and into this neutral point is connected the secondary winding of the transformer KT. The primary winding of the transformer KT is traversed by the primary current of the induction motor. Both the secondary windings of the transformers KT and HT feed in series, through the regulating resistance $r_2$, the slip rings of the frequency converter F. The commutator of the frequency converter F feeds the exciting winding of the exciting machine not shown. Furthermore, the secondary winding of the transformer KT is connected through a non-adjustable risistance $r_3$ to the slip rings of the frequency converter in such a manner that the phase $t'$ of the transformer KT which is connected through the resistance $r_2$ with the slip rings $s'_2$ of the frequency converter is connected through the constant resistance $r_3$ with the slip ring $s_2'''$ of the frequency converter. The current flowing through the resistance $r_3$ produces in the exciting circuit of the commutator machine a voltage which is proportional only to the primary current of the induction motor and which is displaced in phase 30 degrees relative to the additional exciting current required for the compounding and at least approximately takes care of its ohmic drop.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is:—

1. A regulating system for induction motors comprising a wound rotor induction motor, a commutator machine connected in cascade with said motor, an exciter for said commutator machine, means for exciting said exciter with a current derived from the primary circuit of said motor and proportional to the primary current and the slip of said motor and means for causing said exciting current to have a frequency varying with the slip frequency of the induction motor.

2. A regulating system for induction motors comprising an induction motor of the wound rotor type connected in cascade to a commutator machine, an exciter for said commutator machine, a series transformer in the primary circuit of said motor, the secondary of said transformer being connected through a frequency converter to the field of said exciter and an adjustable resistance included in the circuit between the secondary of said transformer and the said exciter field.

3. A regulating system for induction motors comprising a wound rotor induction motor connected in cascade to a commutator machine, an exciter for said commutator machine, a supply system for said motor, a series transformer connected in the primary circuit of said motor, the secondary winding of said transformer being connected to supply excitation to said exciter, adjustable means in said last mentioned connection for varying the slip of said motor while maintaining the slip approximately proportional to the load for any given adjustment, a frequency converter in said exciting circuit and means supplied from said supply system for inducing a voltage in said exciting circuit to overcome the ohmic drop therein.

4. A regulating system according to claim 3, characterized by the fact that the series transformer is connected to feed to the frequency converter a supplementary voltage component for compensating the phase displacement, occurring under loads between the supplied voltage of the frequency converter and the slip ring voltage of the induction motor.

In witness whereof, I have hereunto set my hand this 3rd day of August, 1922.

WALTER SEIZ.